(12) United States Patent
Lambertz

(10) Patent No.: US 8,776,276 B2
(45) Date of Patent: Jul. 15, 2014

(54) CUSHION HAVING DAMPING PROPERTIES

(75) Inventor: Bodo W Lambertz, Pfaffikon (CH)

(73) Assignee: X-Technology Swiss GmbH, Wollerau (CH)

( * ) Notice: Subject to any disclaimer, the term of this patent is extended or adjusted under 35 U.S.C. 154(b) by 43 days.

(21) Appl. No.: 13/502,021

(22) PCT Filed: Oct. 18, 2010

(86) PCT No.: PCT/EP2010/006336
§ 371 (c)(1),
(2), (4) Date: Apr. 13, 2012

(87) PCT Pub. No.: WO2011/045082
PCT Pub. Date: Apr. 21, 2011

(65) Prior Publication Data
US 2012/0198607 A1 Aug. 9, 2012

(30) Foreign Application Priority Data
Oct. 16, 2009 (DE) .................... 20 2009 014 105 U

(51) Int. Cl.
| | | |
|---|---|---|
| A41D 13/015 | (2006.01) | |
| A41D 27/26 | (2006.01) | |
| B62J 1/26 | (2006.01) | |
| B68G 1/00 | (2006.01) | |
| B68G 5/00 | (2006.01) | |
| A41D 1/08 | (2006.01) | |

(52) U.S. Cl.
CPC B68G 1/00 (2013.01); A41D 1/088 (2013.01); B62J 1/26 (2013.01); B68G 5/00 (2013.01); A41D 2600/102 (2013.01)
USPC ............ 2/466; 2/267; 2/243.1; 2/78.2

(58) Field of Classification Search
None
See application file for complete search history.

(56) References Cited

U.S. PATENT DOCUMENTS

| | | | | |
|---|---|---|---|---|
| 4,685,151 A | * | 8/1987 | Kincheloe ..................... | 2/456 |
| 4,825,469 A | * | 5/1989 | Kincheloe ..................... | 2/456 |
| 5,103,505 A | * | 4/1992 | Llorens ......................... | 2/400 |
| 5,401,048 A | * | 3/1995 | Hopkins ..................... | 280/18 |
| 5,588,699 A | * | 12/1996 | Rundle et al. ............ | 297/216.11 |
| 5,781,936 A | * | 7/1998 | Alaloof ......................... | 2/456 |
| 6,012,772 A | * | 1/2000 | Conde et al. ............ | 297/219.11 |
| 6,039,396 A | * | 3/2000 | Muser ......................... | 297/214 |
| 6,152,524 A | * | 11/2000 | Cox ......................... | 297/201 |
| 6,564,387 B1 | * | 5/2003 | Willoughby ................. | 2/69 |
| 6,591,429 B1 | * | 7/2003 | Jaszai ......................... | 2/455 |
| 6,700,034 B1 | * | 3/2004 | Lindsay et al. ............. | 604/378 |
| 7,017,195 B2 | * | 3/2006 | Buckman et al. ........... | 2/455 |
| 2003/0046831 A1 | * | 3/2003 | Westin ......................... | 36/29 |

(Continued)

FOREIGN PATENT DOCUMENTS

| | | |
|---|---|---|
| CA | 2 249 112 | 4/2000 |
| DE | 20 2005 011 552 U1 | 10/2005 |

Primary Examiner — Bobby Muromoto, Jr.
(74) Attorney, Agent, or Firm — Olson & Cepuritis, Ltd.

(57) ABSTRACT

A cushion (1) having damping properties for use in bicycle pants includes an outer shell (2) and a core (3) therewithin surrounded by at least one layer (4) arranged between the outer shell (2) and the core (3). The core (3) and the layers (4) are formed by at least one filler material having different degrees of firmness. A valve (5) is provided in the outer shell to control the passage of air to and from the core (3) and interior cavity. The damping properties of the cushion (1) can be changed by inflating or deflating the core (3) with air.

20 Claims, 1 Drawing Sheet

(56) References Cited

U.S. PATENT DOCUMENTS

Figure 1:
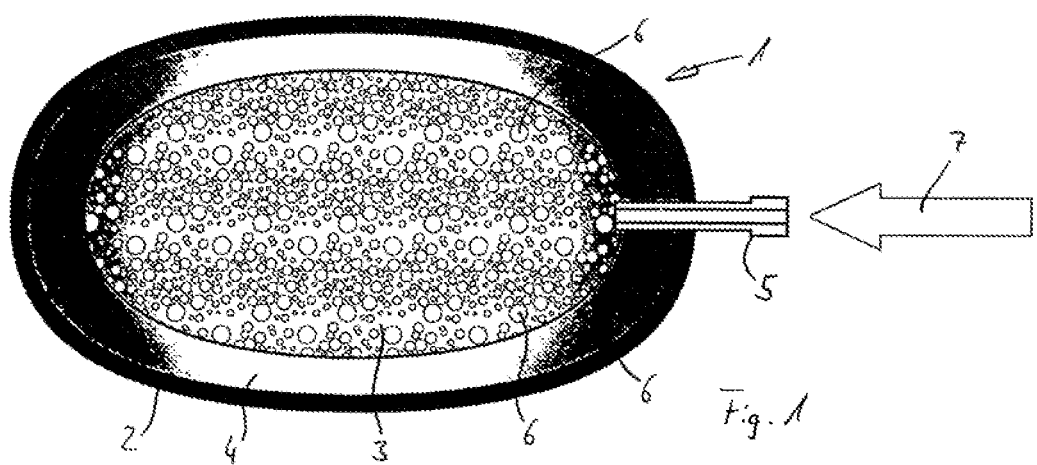

| | | | |
|---|---|---|---|
| 2003/0217414 A1* | 11/2003 | Marson | 5/709 |
| 2005/0067816 A1* | 3/2005 | Buckman | 280/730.1 |
| 2006/0191052 A1* | 8/2006 | Bulian | 2/23 |
| 2007/0186328 A1* | 8/2007 | Bulian | 2/69 |
| 2009/0254003 A1* | 10/2009 | Buckman | 600/595 |
| 2012/0198607 A1* | 8/2012 | Lambertz | 2/466 |
| 2012/0292958 A1* | 11/2012 | Sprouse, II | 297/200 |
| 2012/0316485 A1* | 12/2012 | Fryda et al. | 602/21 |

\* cited by examiner

CUSHION HAVING DAMPING PROPERTIES

RELATED APPLICATION

This is a national stage filing of International Application Serial No. PCT/EP2010/006336 filed Oct. 18, 2010.

The invention relates to a cushion with damping properties for bicycle pants comprising an outer shell and a core, as well as at least one layer positioned between the outer shell and the core.

Cushions with damping properties of various types are already known. In the simplest form, these cushions consist of a filling of foam material that is surrounded by textiles or plastics. They are generally used as seat cushions. In addition, simple air cushions, which consist only of an airtight outer shell and in which the damping is provided by the enclosed air, are already known. The inflatable cushions can be positioned in the objects to be cushioned, such as in sitting surfaces or the like, for example. Inflatable air cushions are also used as heat insulation in items of clothing.

The above-stated cushions are constructed simply in terms of their structure. As the result, they have only relatively slight damping properties or are difficult to handle, as the case may be. In particular, cushions filled with air have the problem that air can escape, so that the damping properties are lost upon damage to the outer shell. Damage frequently occurs, particularly in bicycle pants of the type considered here, because the cushions with the thin outer shell are positioned in the area of the crotch, which is subjected to extraordinarily high levels of stress.

The invention is intended to provide a remedy for this. The task that forms the basis for the invention is that of creating a cushion with damping properties for bicycle pants that has, on the one hand, a high level of damping and is, in addition, changeable in its damping properties. In accordance with the invention, this task is solved through the fact that the core and the layers, which have different levels of hardness, are formed from at least one filling material, and that the core and/or the layers can be changed in their damping properties by means of inflation.

A cushion for bicycle pants with damping properties that has changeable damping properties is created by means of the invention. Through the feeding of air into the inflatable layer with the filling material positioned therein, a possibility exists for increasing or reducing the damping properties. The feeding of air leads to an expansion of the cushion, through which an increase of the damping properties is brought about. Conversely, a draining off of the air leads to a reduction of the damping properties, with a simultaneous reduction of the volume of the cushion.

In one configuration of the invention, the filling material is silicone. The use of silicone as a filling material offers the advantage that silicone, in various classifications, is available as a fluid, a rubber, or an elastomer, so that a broadly diversified spectrum is consequently available for the filling material.

In another configuration of the invention, the filling material is an open-pored foam. The use of the open-pored foam offers the possibility, in particular, of inflating it by feeding in air and thereby bringing about a change in the damping properties.

A valve is advantageously provided. The possibility of blowing air into the cushion by mouth is provided with the help of the valve. The possibility also exists for letting air out of the cushion with the help of the valve, as desired.

Advantageously, the core and/or the layers are self-inflating. In self-inflating cushions, no air is contained in the core and/or the layers in the compressed condition; as soon as the valve is opened, the elastic filling material used expands, as the result of which the cushion resumes its original shape. Air is thereby sucked into the filling material and remains in the filling material for as long as the valve is closed. Through the opening of the valves and the simultaneous exertion of pressure on the cushion, the air can escape from the core of the layer again.

Figure 2:
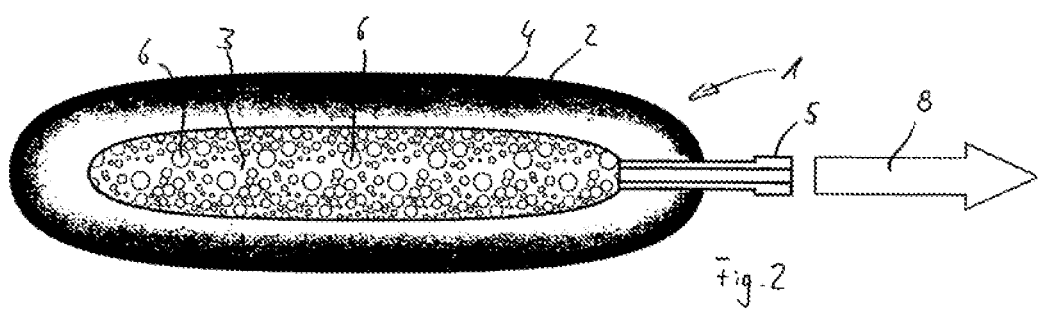

Other further developments and configurations of the invention are stated in the remaining sub-claims. One embodiment of the invention is depicted in the diagrams, and is described in individual terms in the following. These depict the following:

FIG. 1: A schematic representation of a cross-section through a cushion in accordance with the invention in the inflated condition; and:

FIG. 2: A schematic representation of the cushion depicted in FIG. 1 in an only partially inflated condition.

The cushion 1 selected as an embodiment comprises an outer shell 2 and a core 3. A layer 4 is positioned between the outer shell 2 and the core 3. The cushion 1 is provided with a valve 5, which passes through the outer shell 2 as well as the layer 4, and consequently projects into the core 3. The valve 5 is provided for inflation by mouth. In one modification of the embodiment, the valve 5 can also be constructed as a non-return valve.

In the embodiment, the outer shell 2 is constructed in an air-permeable manner. It is expandable, in order to be able to undergo a change of shape through stress as well as through an inflation of the cushion. The core 3 and the layer 4 are formed from at least one filling material. They have different levels of hardness. In the embodiment, the filling material for the layer 4 is a solid silicone; the filling material for the core 3 is a foamed silicone. The foamed silicone of the core 3 contains air pockets, which are marked in the figures with "6".

In one modification of the embodiment, it is possible to provide several layers 4 between the outer shell 2 and the core 3. In this case, the individual layers can likewise have differing levels of hardness. It is thus possible, for example, in a way comparable to the embodiment depicted in the figures, to produce the core 3 from foamed silicone, and to produce the external layer adjacent to the outer shell 2 from solid silicone. An additional layer—not depicted—, which has fluid silicone as its filling material, can be positioned between the core 3 and the layer 4, which is then on the outside. In one modification of the embodiment, the possibility also exists for using an open-pored foam instead of the foamed silicone, which can be a polyurethane foam, for example. The use of polyether foams is also possible.

The core 3 in the embodiment can be changed in its damping properties by means of inflation. For this purpose, air can be blown into the core through the valve 5 corresponding to the arrow 7 depicted in FIG. 1. The cushion is thereby inflated, as the result of which its damping properties are improved. In the reverse way, air can, in order to reduce the volume and to reduce the damping properties of the cushion, be let out through the valve 5, as indicated by the arrow 8 depicted in FIG. 2. It is possible to develop the core 3 and/or the layers 4 in a self-inflating manner. In this case, the valve 5 can easily be opened in order to make possible an enlargement of the volume of the cushion 1. Thus, for the purpose of transport, for example, the cushion can be compressed and the valve can be closed. In order to use the cushion 1, the valve 5 is opened, through which the filling material in the core 3 is, in accordance with the embodiment, expanded in accordance with its natural expansion and air is sucked into the core 3.

After closing the valve, an improved damping property of the cushion is consequently also brought about.

The cushion 1 is used as a cushion in bicycle pants. It is positioned in the crotch of the bicycle pants. Such an arrangement is known from U.S. Pat. No. 6,928,665 B1, for example. In its simplest form, the cushion then has a perineal area that covers the crotch portion of the bicycle pants. A buttocks area, which covers the saddle area 5 of the pants, is also provided. In addition to the improvement of the damping properties per se, a varying of the damping properties is made possible in the cushion in accordance with the invention through the feeding of the air into the inflatable layer with the filling material positioned therein. The adjustment of the damping properties to the sensitivity of the specific cyclist is consequently made possible for the first time, whereas a change in the damping is not possible in the known cushions in cycling pants.

The invention claimed is:

1. A cushion with damping qualities for cycling pants comprising an outer shell defining an inflatable enclosed interior cavity, the interior cavity being filled with a core comprising an inflatable filling material, and wherein the core is completely surrounded by and enclosed within at least one cushioning layer disposed between the outer shell and the core within the interior cavity, characterized in that the core and the cushioning layer are comprised of at least one cushioning material displaying varying degrees of hardness, and wherein the outer shell comprises valve means for inflating and deflating the core and the interior cavity to vary the damping properties of the cushion.

2. A cushion according to claim 1, characterized in that the cushioning material is silicone.

3. A cushion according to claim 1, characterized in that the cushioning material is an open-pore foam.

4. A cushion according to claim 3, characterized in that the valve means comprises a valve adapted for oral inflation of the cushion by blowing air into the interior cavity and the core by mouth to increase the damping characteristics of the cushion.

5. A cushion according to claim 4, characterized in that the valve is a check valve.

6. A cushion according to claim 4, characterized in that the core is in a compressed condition and is inflated when the valve is opened due to vacuum in the core and the interior cavity.

7. A cushion according to claim 1, characterized in that the outer shell is air-permeable.

8. A cushion according to claim 1, characterized in that several individual cushioning layers are provided between the outer shell and the core.

9. A cushion according to claim 8, characterized in that the individual cushioning layers display varying degrees of hardness.

10. Cycling pants having a cushion comprising an outer shell defining an inflatable enclosed interior cavity, the interior cavity being filled with a core comprising an inflatable filling material, and wherein the core is completely surrounded by and enclosed within at least one cushioning layer disposed between the outer shell and the core within the interior cavity, characterized in that the core and the cushioning layer are comprised of at least one cushioning material displaying varying degrees of hardness, and wherein the outer shell comprises valve means for inflating and deflating the core and the interior cavity to vary the damping properties of the cushion.

11. Cycling pants according to claim 10, characterized in that the cushion is disposed in the crotch of the cycling pants.

12. The cushion of claim 1 wherein the valve means comprises a valve adapted for inflating and deflating the core in and the interior cavity to vary the damping properties of the cushion, whereby, fluid can flow into the core through the valve to increase the volume of the core and the cavity and thereby increase the damping properties of the cushion and fluid can flow from the core through the valve to decrease the volume of the core and cavity and thereby decrease the damping properties of the cushion.

13. A cushion with damping qualities for cycling pants comprising an outer shell having an inner surface lined a cushioning layer having (a) an outer surface in contact with the inner surface of the shell and (b) an inner surface defining an inflatable, enclosed cavity therewithin; the cavity being filled with a core comprising an inflatable filling material in contact with the inner surface of the cushioning layer and completely enclosed therewithin, wherein the core and the cushioning layer are composed of at least one cushioning material displaying varying degrees of hardness, and the outer shell comprises valve in fluid communication with the interior cavity adapted for inflating and deflating the core and the interior cavity to vary the damping properties of the cushion.

14. The cushion of claim 13 wherein the cushioning material is selected from the group consisting of silicone and an open-pore foam.

15. The cushion of claim 13 wherein valve is adapted for oral inflation of the cushion by blowing air into the interior cavity and the core by mouth to increase the damping characteristics of the cushion.

16. The cushion of claim 15 wherein the valve is a check valve.

17. The cushion of claim 13 wherein the core is in a compressed condition and is inflated when the valve is opened due to vacuum in the core and the interior cavity.

18. The cushion of claim 13 wherein the outer shell is air-permeable.

19. The cushion of claim 13 wherein the lining material comprises several individual layers of cushioning material.

20. Cycling pants comprising the cushion of claim 13.

* * * * *

UNITED STATES PATENT AND TRADEMARK OFFICE
CERTIFICATE OF CORRECTION

| | |
|---|---|
| PATENT NO. | : 8,776,276 B2 |
| APPLICATION NO. | : 13/502021 |
| DATED | : July 15, 2014 |
| INVENTOR(S) | : Bodo W. Lambertz |

Page 1 of 1

It is certified that error appears in the above-identified patent and that said Letters Patent is hereby corrected as shown below:

In The Claims

Claim 4 - "A cushion according to claim 3," change to --A cushion according to claim 1,--

Signed and Sealed this
Sixth Day of January, 2015

Michelle K. Lee
*Deputy Director of the United States Patent and Trademark Office*

UNITED STATES PATENT AND TRADEMARK OFFICE
CERTIFICATE OF CORRECTION

PATENT NO.        : 8,776,276 B2                                    Page 1 of 1
APPLICATION NO.   : 13/502021
DATED             : July 15, 2014
INVENTOR(S)       : Bodo W. Lambertz It is certified that error appears in the above-identified patent and that said Letters Patent is hereby corrected as shown below:

In The Claims

Col. 3, line 34, Claim 4 - "A cushion according to claim 3," change to --A cushion according to claim 1,--

This certificate supersedes the Certificate of Correction issued January 6, 2015.

Signed and Sealed this
Tenth Day of March, 2015

Michelle K. Lee
*Deputy Director of the United States Patent and Trademark Office*